US006460879B2

United States Patent
Tanase et al.

(10) Patent No.: US 6,460,879 B2
(45) Date of Patent: Oct. 8, 2002

(54) AIR BAG IN USE FOR HEAD PROTECTION AIR BAG DEVICE

(75) Inventors: Toshinori Tanase; Choko Tanabe, both of Nishikasugai-gun; Mitsuyoshi Ohno, Anjyo; Norio Urushi, Toyota, all of (JP)

(73) Assignees: Toyoda Gosei Co., Ltd., Aichi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/907,956

(22) Filed: Jul. 19, 2001

(65) Prior Publication Data

US 2002/0017775 A1 Feb. 14, 2002

(30) Foreign Application Priority Data

Jul. 19, 2000 (JP) ........................................ 2000-219791

(51) Int. Cl.[7] .............................................. B60R 21/22
(52) U.S. Cl. .................. 280/730.2; 280/743.1
(58) Field of Search ........................... 280/730.2, 730.1, 280/743.1

(56) References Cited

U.S. PATENT DOCUMENTS 6,155,596 A * 12/2000 Nakajima et al. ......... 280/730.2
6,176,513 B1 * 1/2001 Neidert ..................... 280/729
6,176,514 B1 * 1/2001 Einsiedel .................. 280/730.2
6,199,898 B1 * 3/2001 Masuda et al. ............. 280/729
6,224,091 B1 * 5/2001 Eyrainer et al. ........... 280/730.2
6,302,434 B2 * 10/2001 Nakajima et al. .......... 280/730.1
6,386,581 B1 * 5/2002 Ohno ........................ 180/282

FOREIGN PATENT DOCUMENTS

| DE | 298 06 200 U 1 | 10/1998 |
| GB | 2 324 068 A | 10/1998 |
| JP | 10-138858 | 5/1998 |

* cited by examiner

Primary Examiner—Paul N. Dickson
Assistant Examiner—Ruth Ilan
(74) Attorney, Agent, or Firm—Pillsbury Winthrop LLP (57) ABSTRACT

An air bag is stored along the peripheral edge of the upper fringe of an opening on the indoor side in a state that it is covered with a door of an air bag cover and folded. When receiving inflation gas, the air bag forcibly opens the door and develops and inflates downward so as to cover the opening. In a region of an inflating section to which gas for inflation flows, a plurality of thickness defining members, which couple the cabin-inside side wall with the cabin-outside side wall to make a thickness of the inflating section uniform, are arranged side by side in the front/rear direction, while extending in the vertical direction. The thickness defining member disposed near the unsmooth development part of the door is disposed such that the upper end thereof is located at a position lower than the upper end of the thickness defining member.

6 Claims, 7 Drawing Sheets

FIG. 7

AIR BAG IN USE FOR HEAD PROTECTION AIR BAG DEVICE

BACKGROUND OF THE INVENTION

1. Field of the Invention

The present invention relates to an air bag in use for a head protection air bag device carried on a motor vehicle. More particularly, the invention relates to an air bag in use for a head protection air bag device in which the air bag is stored along the peripheral edge of the upper fringe of an opening on the indoor side in a state that the air bag is covered with an air bag cover and folded.

The present application is based on Japanese Patent Application No. Hei. 2000-219791, which is incorporated herein by reference.

2. Description of the Related Art

In this type of head protection air bag device, as described in Unexamined Japanese Patent Publication No. Hei. 10-138858, the air bag, while being folded, is stored along the peripheral edge of the upper fringe of an opening on the indoor side in a state that the air bag extends from the front pillar to the rear part beyond the center pillar.

At the roof side rail on the upper fringe of an opening on the indoor side, the air bag folded is stored while being covered with a door of an air bag cover, which is located on the lower edge of the roof head lining. The air bag forcibly opens the door of the air bag cover, and develops and inflates. At the center pillar, the air bag develops and inflates so as to cover the indoor side of the center pillar garnish disposed on the indoor side of the center pillar.

In the conventional head protection air bag device, the lower fringe of the door of the air bag cover is connected to the upper fringe of the pillar garnish of the center pillar in a state that it is bent to the cabin outside. When the air bag presses the door to open, the door temporarily bends such that it climbs over the upper edge of the pillar garnish, and opens. Accordingly, the door does not open smoothly. In this respect, there is room for improvement on how to quickly complete the developing and inflating operations of the air bag Similarly, at the place where the assist grip is disposed, the door interferes with the assist grip, so that an opening angle of the door is insufficient sometimes. Also in this case, the rapid completion of the development and expansion is hindered.

SUMMARY OF THE INVENTION

Accordingly, an object of the present invention is to provide an air bag for a head protection air bag device which rapidly completes its development and inflation even when a door of an air bag cover has a part or parts hard to open.

The present invention is directed to an air bag in use for a head protection air bag device. The air bag is stored along the peripheral edge of the upper fringe of an opening on the indoor side in a state that the air bag is covered with a door of an air bag cover and folded. When receiving inflation gas, the airbag forcibly opens the door and develops and inflates downward so as to cover the opening. In a region of an inflating section to which gas for inflation flows, a plurality of thickness defining members, which couple a cabin-inside side wall with a cabin-outside side wall to make a thickness of the inflating section uniform, are arranged side by side in the front/rear direction, while extending in the vertical direction, In a first air bag of the invention, the thickness defining member disposed near the unsmooth development part of the door is disposed such that the upper end thereof is located at a position lower than the upper end of the thickness defining member in a state that the air bag is developed flat.

In a second air bag of the invention, of a plurality of inflow ports between the upper ends of the thickness defining members or the upper end of the thickness defining member and the peripheral edge part of the inflating section, an opening width of the inflow port being located near the unsmooth development part of the door as viewed in the front/rear direction is larger than an opening width of each of the adjacent inflow ports as viewed in the front/rear direction in a state that the air bag is developed flat.

In the thus constructed air bag in use for the head protection air bag device, when gas for inflation is introduced into the inflating section, the air bag having been folded develops and expands downward from the peripheral edge of the upper fringe of the opening in such a way that the air bag presses the door of the air bag cover to open and brings out of its folded state. And, it covers the opening on the indoor side.

In the first air bag of the invention, the upper end of the thickness defining member, which is located at position lower than the thickness defining member adjacent thereto is disposed near of the unsmooth development part of the door of the air bag cover. Accordingly, an inflation part which expands in the front/rear direction in a region above the thickness defining member is also vertically expanded more largely by a volume corresponding to the dimension of the lowering of the upper end. As a result, a large force to forcibly open the unsmooth development part of the door is secured. For this reason, even when the unsmooth development part of the door interferes with another member at the time of its opening, it is rapidly and forcibly opened. This technical feature contributes reduction of the time for the air bag 15 to complete the development and expansion.

In the second air bag of the invention, the opening width of the inflow port (as viewed in the front/rear direction) located near the unsmooth development part is selected to be larger than the opening width of the inflow port adjacent thereto (as viewed in the front/rear direction) Therefore, a vertically expanding inflation part of the inflow port, which is located near the unsmooth development part, expands in the front/rear direction more largely than the expansion part of the inflow port adjacent thereto, which vertically expand, by a distance corresponding to the opening width of the inflow port. As a result, a large force to forcibly open the unsmooth development part of the door is secured. For this reason, even when the unsmooth development part of the door interferes with another member at the time of its opening, it is rapidly and forcibly opened. This technical feature contributes reduction of the time for the air bag 15 to complete the development and expansion.

Thus, the air bag for a head protection air bag device, which is constructed according to the present invention, is capable of rapidly completing its development and inflation even when a door of an air bag cover has a part or parts hard to open.

Features and advantages of the invention will be evident from the following detailed description of the preferred embodiments described in conjunction with the attached drawings.

DETAILED DESCRIPTION OF THE PREFERRED EMBODIMENTS

An embodiment of the present invention will be described with reference to the accompanying drawings.

Figure 1:
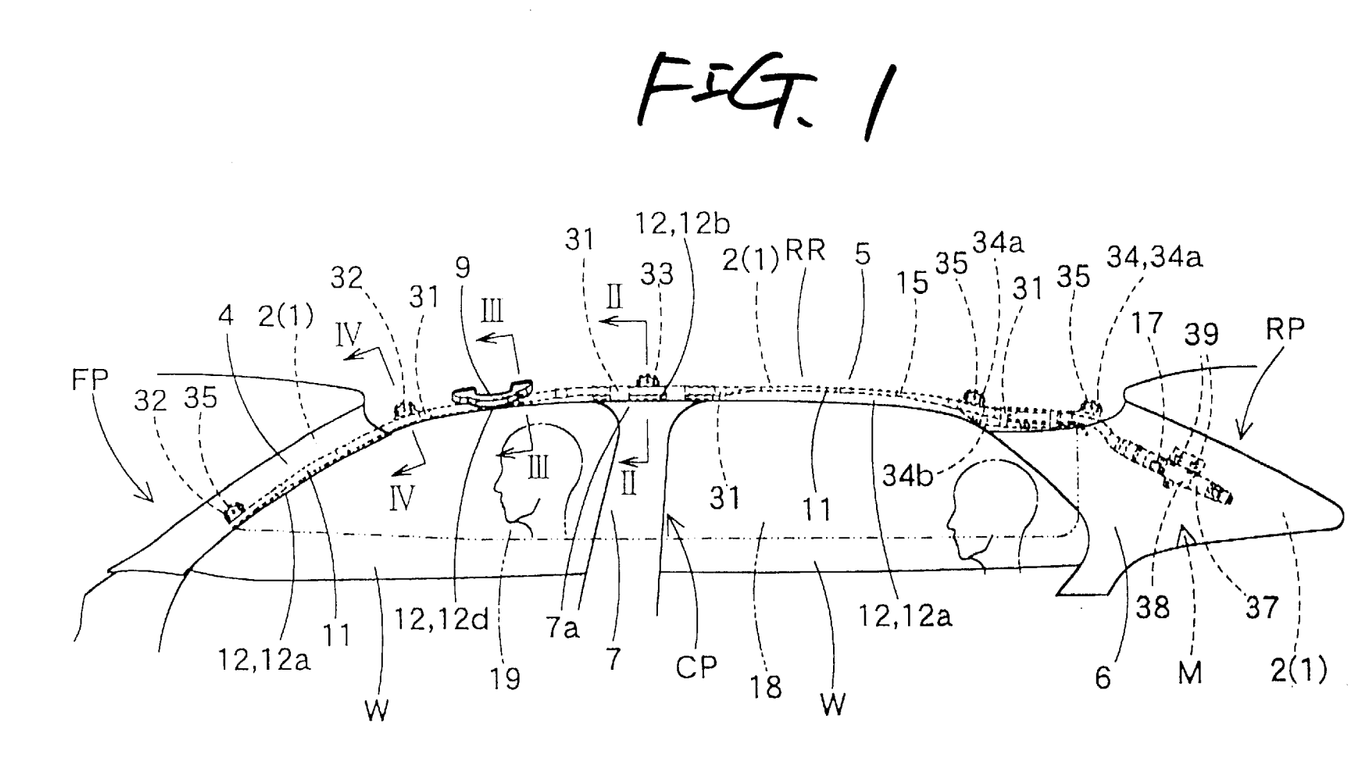
FIG. 1 is a front view showing a head protection air bag device into which an airbag forming an embodiment of the present invention is incorporated, the view being taken from the cabin inside.

An air bag 15 of the embodiment in use for a head protection air bag device M, while being folded, is stored in a region including a front pillar FP, a roof side rail RR and a rear pillar RP, while extending along the peripheral edge of the upper fringe of an opening W of the door and window on the indoor side, as shown in FIG. 1.

The head protection air bag device M is made up of an air bag 15, an inflator 37, mounting brackets 32 to 34, 38, and an air bag cover 11.

The inflator 37, as shown in FIG. 1, takes the form of a cylinder which supplies gas for inflation to the folded air bag 15. Gas-inflow parts 17 to be given later are attached to the air bag 15.

The mounting bracket 38 is made with a metal sheet, and holds down from the outer peripheral side the inflator 37 to which the gas-inflow parts 17 of the air bag 15 are attached, for each gas-inflow part 17. The mounting bracket is mounted on a sheet metal inner panel 2 of a vehicle body 1 on the indoor side of the rear pillar RP by means of two mounting bolts 39.

Figure 4:
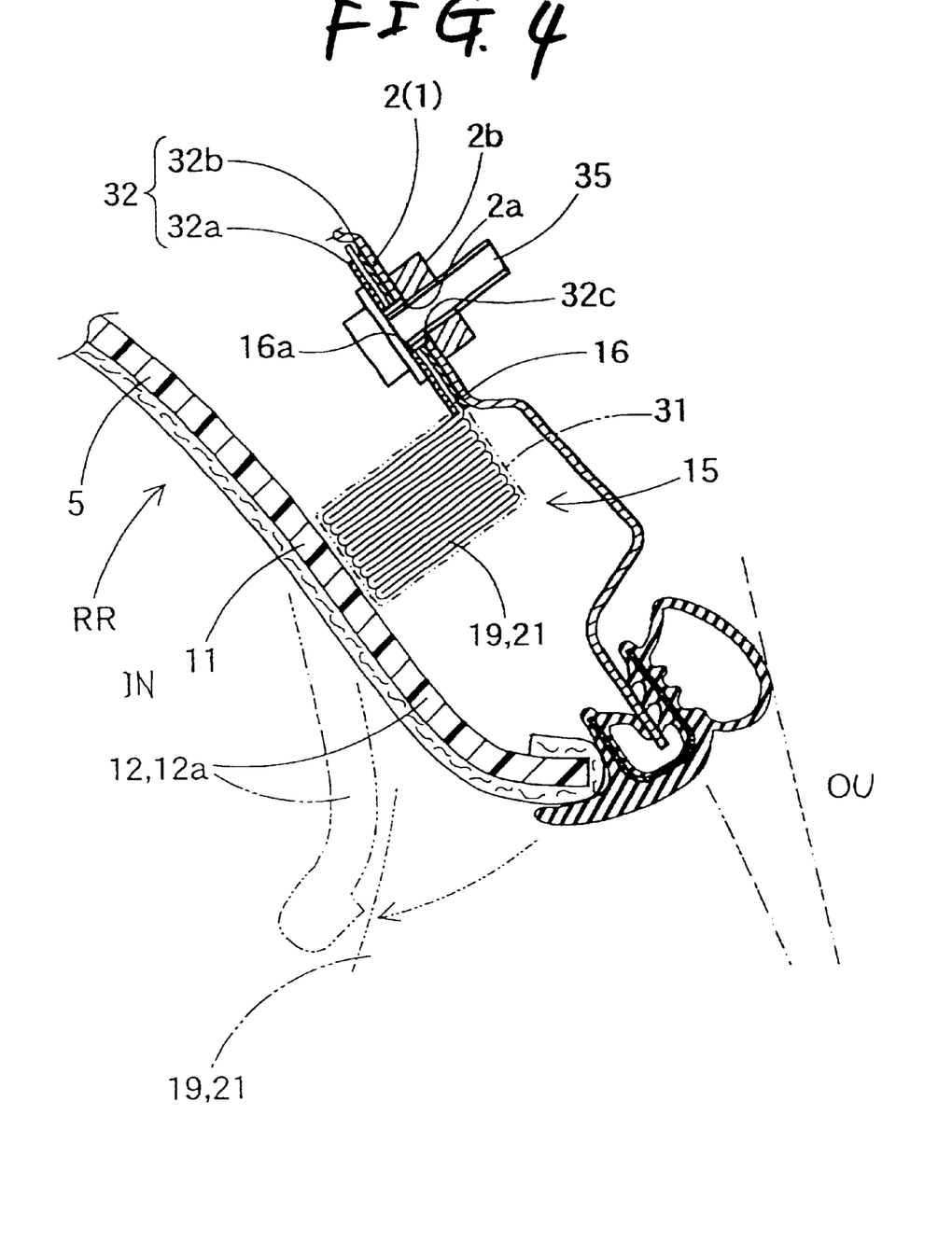
FIG. 4 is an enlarged, longitudinal sectional view taken on line IV—IV in FIG. 1.

As shown in FIGS. 1 and 4, the mounting bracket 32 made with a metal sheet sandwiches two mounting parts 16 to be described later. The mounting bracket 32 includes an inner plate 32a on the cabin inside IN and an outer plate 32b on the cabin outside OU. Mount holes 32c are formed in those inner and outer plates 32a and 32b, while corresponding to the mounting parts 16. The mounting parts 16 are mounted on the inner panel in a manner that a mount bolt 35 is inserted into mount holes 16a and 32c, and screwed into a nut 2b fastened to the circumferential edge of a mount hole 2a of the inner panel.

Figure 2:
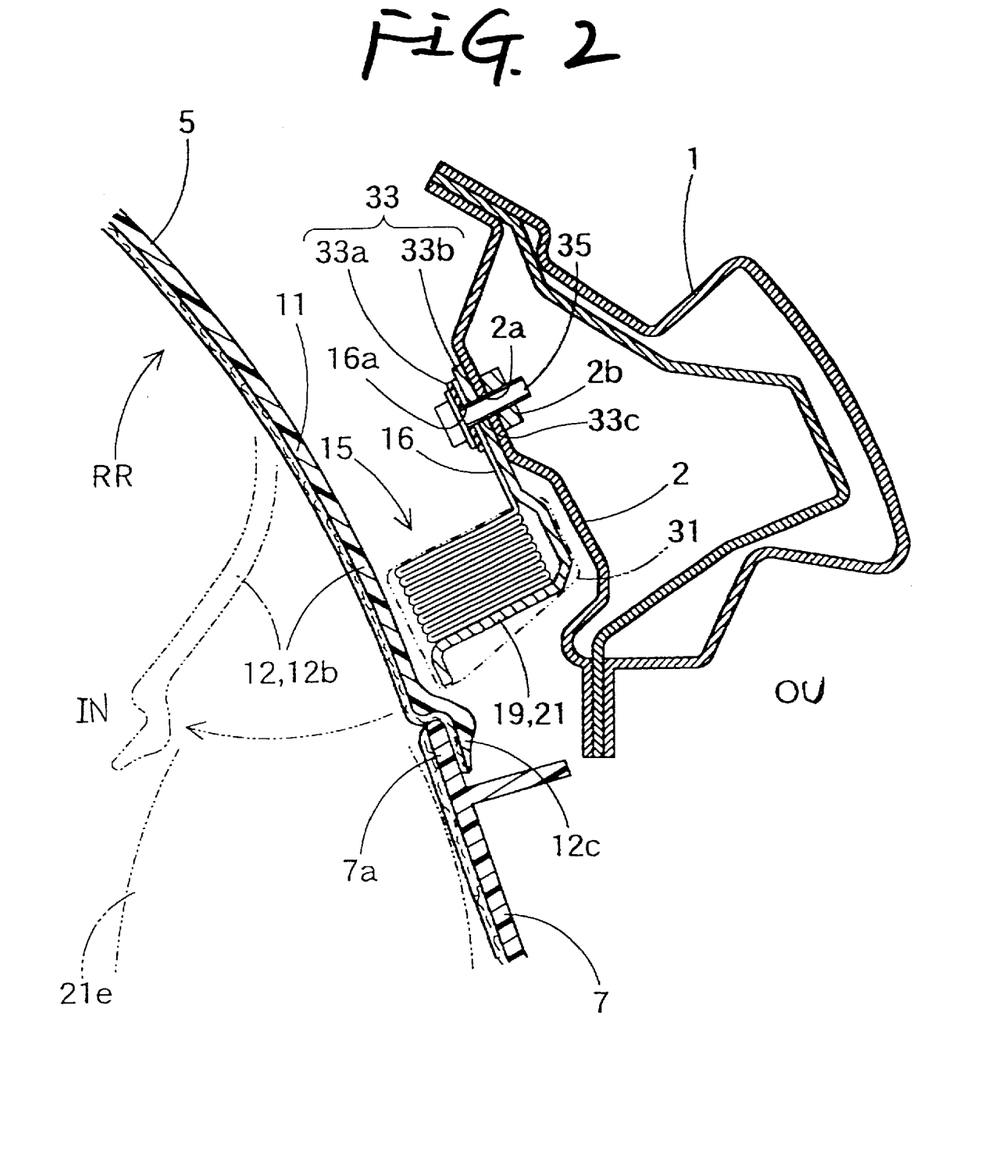
FIG. 2 is an enlarged, longitudinal sectional view taken on line II—II in FIG. 1.

As shown in FIGS. 1 and 2, the mounting bracket 33 made with a metal sheet sandwiches the mounting parts 16 provided on the center pillar CP, which is located at a mid position of the air bag 15 as viewed in the front/rear direction. The mounting bracket includes an inner plate 33a located on the cabin inside IN, like the inner plate 32a of the mounting bracket 32, and an outer plate 33b located on the cabin outside OU. The outer plate 33b supports a surface of the air bag 15 on the car outside and a lower surface thereof. It is shaped like L in cross section so as to prevent it from entering the cabin outside OU of a garnish 7 of the center pillar CP when the air bag 15 is developed and inflated. And, it is disposed extending in the front/rear direction so that it ranges over the entire region above the center pillar CP.

Mount holes 33c are through formed in the inner and outer plates 33a and 33b at a position corresponding to the mount holes 16a of the mounting parts 16. The mount bolt 35 will be inserted into the mount holes 33c.

The mounting bracket 34 made with a metal sheet, as shown in FIG. 1, sandwiches two mounting parts 16 located at the rear part of the air bag 15. The mounting bracket, like the mounting bracket 33, includes two inner plates 34a located on the cabin inside IN and one outer plate 34b located on the cabin outside OU of the inner plates 34a. The outer plate 34b also supports the car-outside surface of the folded air bag 15, and is shaped like L in cross section so as to prevent it from entering the car outside of a garnish 6 of the rear pillar RP when the air bag 15 is developed and inflated. Mount holes (not attached with reference numeral) through which the mount bolt 35 will be inserted are formed in the inner and outer plates 34a and 34b at a position corresponding to the mount holes 16a of the mounting parts 16.

As shown in FIGS. 1 to 4, the air bag cover 11 is defined by the lower edges of a pillar garnish 4 located on the front pillar FP and a roof head lining 5 located on the roof side rail RR. A door 12 is provided on the lower edge of the air bag cover 11. Its lower end is opened to the cabin inside IN at the time of development and inflation of the air bag 15.

The pillar garnish 4 made of synthetic resin is secured to the inner panel 2 of the vehicle body 1 on the indoor side of the front pillar FP. A door 12 is disposed on its lower edge and opened to the cabin inside IN when the air bag develops and expands so as to allow the air bag 15 to project.

Figure 3:
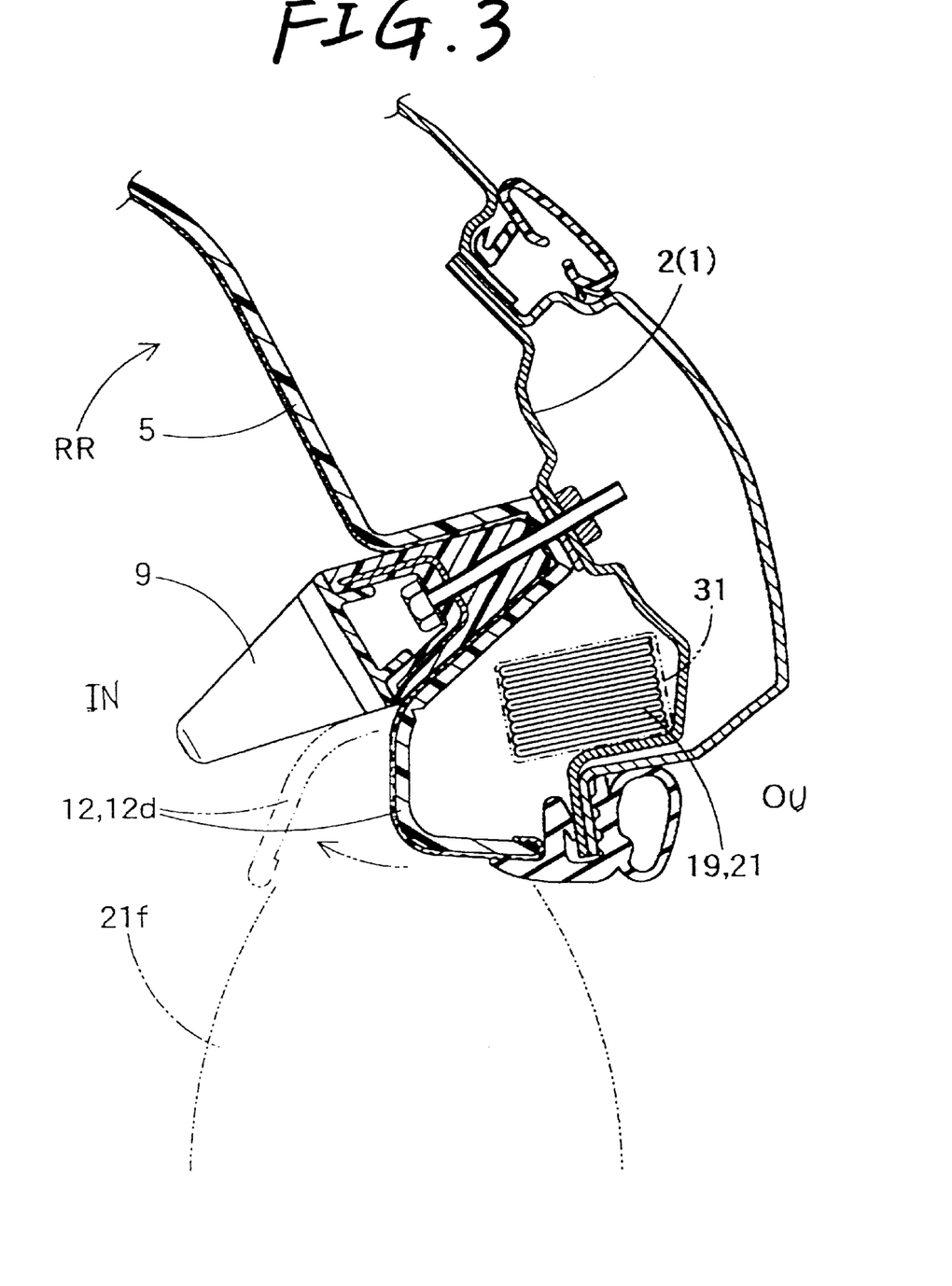
FIG. 3 is an enlarged, longitudinal sectional view taken on line III—III in FIG. 1.

The roof head lining 5, as shown in FIGS. 2 to 4, is made of synthetic resin, and is secured to the inner panel 2 of the vehicle body 1 on the cabin inside IN of the roof side rail RR. A door 12 is disposed on its lower edge and opened to the cabin inside IN when the air bag develops and expands so as to allow the air bag 15 to project.

The door 12 is formed with a general part 12a easy to open, and unsmooth development parts 12b and 12d hard to open. The unsmooth development part 12b is located above the center pillar CP. As shown in FIG. 2, the unsmooth development part 12b is disposed such that the lower end 12c of the unsmooth development part 12b is bent to the cabin outside OU and joined to the upper end 7a of a center pillar garnish 7. The unsmooth development part 12b is hard to open since it must ride over the upper end 7a when it opens. As shown in FIG. 3, the unsmooth development part 12d interferes with an assist grip 9 when it opens. Accordingly, it is difficult to secure a large opening angle of it, and hence it is hard to open.

Figure 5:
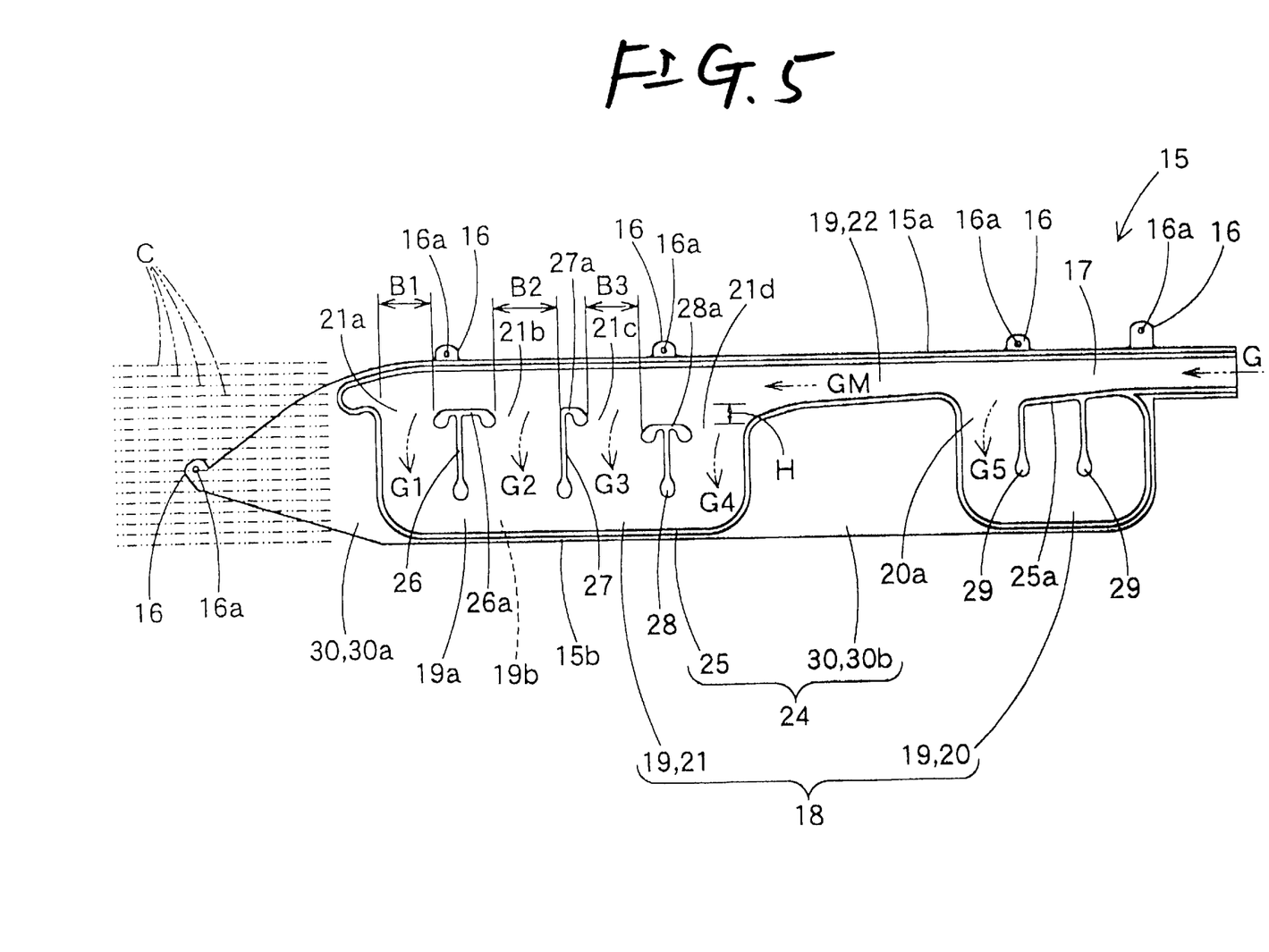
FIG. 5 is a front view showing an air bag being developed flat in the embodiment.

The air bag 15, as shown in FIGS. 1 and 5, includes a main body 18, a gas inflow part 17, and a plurality of mounting parts 16. The main body 18 receives gas for inflation from the inflator 37, and develops the folded air bag into an inflated one to cover the opening W. The gas-inflow parts 17 introduces the inflation gas from the inflator 37 to the main body 18. The mounting parts 16 are provided on the upper edge 15a of the main body 18.

The gas-inflow parts 17 project rearward from the main body 18, and reaches a position near an inflow port 20a of a rear-seat inflation section 20 to be described later. And those communicate with the rear end of a communication expansion part 22. Portions of the gas-inflow parts 17, which project rearward from the main body 18, are externally applied to the inflator 37.

The plurality of mounting parts 16 are disposed projecting above a peripheral edge part 25 on the upper edge 15a side of the main body 18 and a plate-like member 30, which will be described later. The mounting brackets 32, 33 and 34 used for the mount on the inner panel 2 are secured to the mounting parts 16. The mount holes 16a through which the mount bolt 35 will be inserted are formed in the mounting parts 16.

The main body 18 is formed with an inflating section 19 which communicates with the gas-inflow parts 17, receives the inflation gas, and inflates to separate a cabin-inside side wall 19a and a cabin-outside side wall 19b, and a non-inflating portion 24 which rejects the incoming gas for inflation.

The main body 18, together with the mounting parts 16 and the gas-inflow parts 17, is hollow woven by using polyamide and polyester threads. The hollow woven bag is then coated with silicone to have a coating layer thereover, in order to increase the heat resistance and to prevent the inflation gas from leaking. The coating layer is formed on the outer surface of the woven bag because it is impossible to coat the inner wall of the woven bag.

The inflating section 19 includes a rear-seat inflation section 20 that may be located on the rear seat side, a front-seat inflation section 21 that may be locate on the front seat side, and a communication inflation part 22 which may communicate with the gas-inflow parts 17 and sets up an intercommunication between the upper parts of the front and rear seat inflation parts 21 and 22.

The non-inflating portion 24 is formed such that the cabin-inside side wall 19a and the cabin-outside side wall 19b are coupled together. In the embodiment, it is formed with a peripheral edge part 25, thickness defining members 26, 27, 28 and 29, and a plate-like member 30. The peripheral edge part 25 is disposed surrounding the peripheral edges of the inflating section 19 and the gas-inflow parts 17. Further, it includes a partitioning part 25a parting the space into the gas-inflow part 17 and the rear-seat inflation section 20.

The plate-like member 30 includes a triangular plate portion 30a provided on the front side of the main body 18, and a rectangular plate portion 30b provided under the communication inflation part 22 between the front and rear seat inflation parts 21 and 20. The plate-like member 30 defines an overall configuration of the main body 18 ranging from he gas-inflow parts 17 to the front end of the main body 18. Further, it reduces a time taken till the inflating operation ends.

The peripheral edge part 25 and the thickness defining members 26 to 29, and the plate-like member 30 are woven more densely than the plate-like member 30. The plate-like member 30 is coarsely woven because it is not located at the boundary of the inflating section 19 and hence there is no need of taking any measure for preventing the inflation gas from leaking.

The thickness defining members 26 to 28 are substantially shaped like T or inverse J while vertically extending within a region of the front-seat inflation section 21. Those parts are arranged side by side as viewed in the longitudinal direction of the vehicle, while being separated from the peripheral edge part 25. The thickness defining members 29, shaped like I, extend downward from the partitioning part 25a of the peripheral edge part 25 into a region of the rear-seat inflation section 20, while being arranged side by side as viewed in the longitudinal direction.

Those thickness defining members 26 to 29 are provided for making even the thickness of the front and back-seat inflation parts 21 and 22 when the inflation gas flows into the inflating section 19 to inflate it. Further, those parts cause a structure ranging from a position near the gas-inflow parts 17 to the front part of the main body 18 to exhibit a tension. With this, even if such a pressing force as to press the main body 18 out of the vehicle acts on the main body 18, the main body 18 is not moved out of the vehicle.

Of the thickness defining members 26 to 28 disposed within a region of the front-seat inflation section 21, the thickness defining member 28, which is located right under and near the unsmooth development part 12b of the door 12 of the air bag cover 11, is disposed such that the upper end 28a of the thickness defining member is located at position lower than the upper ends 26a and 27a of the remaining thickness defining members 26 and 27 by a dimension H of about 30 mm to 50 mm (35 mm in the embodiment in a state that the air bag 15 is developed flat.

An opening width B2 (as viewed in the front/rear direction) of an inflow port 21b allowing the inflation gas to flow downward, which is between the thickness defining members 26 and 27 being located right under and near the unsmooth development part 12d, is selected to be larger than an opening width B3 (as viewed in the front/rear direction) of an inflow port 21c between the thickness defining members 27 and 28, and an opening width B1 (as viewed in the front/rear direction) of an inflow port 21a between the thickness defining member 26 and the peripheral edge part 25 in a state that the air bag 15 is developed flat. The thickness defining member 27 is shaped like an inverse J, while the other thickness defining members 26 and 28 are shaped like T. In the embodiment, the opening width B1 (B3)=about 90 mm, and the opening width B2=about 110 mm.

An inflation gas G flows into the air bag through the gas-inflow parts 17. Then, a main stream GM of the gas flows forward within the communication inflation part 22, and forward above the front-seat inflation section 21. Branch streams G1 to G4 of the gas, which are branched out from the main stream GM, flow downward via the inflow port 21a between the peripheral edge part 25 and the thickness defining member 26, the. inflow port 21c between the thickness defining members 26 and 27, the inflow port 21c between the thickness defining members 27 and 28, and the inflow port 21d between the thickness defining member 28 and the peripheral edge part 25, and inflates the front-seat inflation section 21. The branch stream G5 flows downward from the inflow port 20a between the peripheral edge part 25 and the partitioning part 25a to inflate the rear-seat inflation section 20.

Mounting of the airbag 15 to the vehicle will be described. An air bag is hollow woven, cut into a predetermined shape, bored to form mount holes 16a, coated to form a coating layer, and folded by a folding machine. In the embodiment, as indicated by two-dot chain lines in FIG. 5, folding is repeated in opposite directions and holding edges C are formed at the crests and troughs, whereby the air bag is formed like bellows acting so as to move the lower edge of the 15b to the upper edge 15a.

After folded, the air bag is wrapped with a tape 31, which may be broken, in order to prevent its re-expansion. Then, the inflator 37 and the mounting brackets 32 to 34, and 38 are mounted on it, whereby an air bag assembly is formed. A tape 31, which may be broken, is further applied to the areas of the mounting brackets 33 and 34 so as to prevent those mounting brackets 33 and 34 from separating from the air bag 15.

The mounting brackets 32 to 34, and 38 are located at predetermined positions of the inner panel 2; The mount holes 16a or the like are passed therethrough and fastened by bolts 35 and 39; and the mounting brackets 32 to 34; and 38 are fastened to the inner panel 2, whereby the air bag assembly is mounted to the vehicle body 1. Thereafter, the pillar garnish 4 and the roof head lining 5 are attached to the vehicle body 1. Further, a rear pillar garnish 6, a center pillar garnish 7, an assist grip 9 and the like are attached to the vehicle body 1. Here, the air bag 15, together with the head protection air bag device M, has been mounted on the vehicle.

The head protection air bag device M is mounted on the vehicle, and the inflator 37 is operated. An inflation gas G output from the inflator 37 flows from the gas-inflow parts 17 to the communication inflation part 22 of the inflating section 19. The main stream GM of the inflation gas G is branched out into branch streams G1 to G5 of gas. Those branch streams G1 to G5 flow into the front-seat inflation section 21 and the rear-seat inflation section 20. The inflating section 19 starts to expand while b ringing out of its folded state. The air bag 15 breaks the tape 31 with which the air bag is wrapped; forcibly opens the rear pillar garnish 6 and the roof head lining 5; and greatly expands so as to cover the opening W as indicated by a two-dot chain line.

Figure 6:
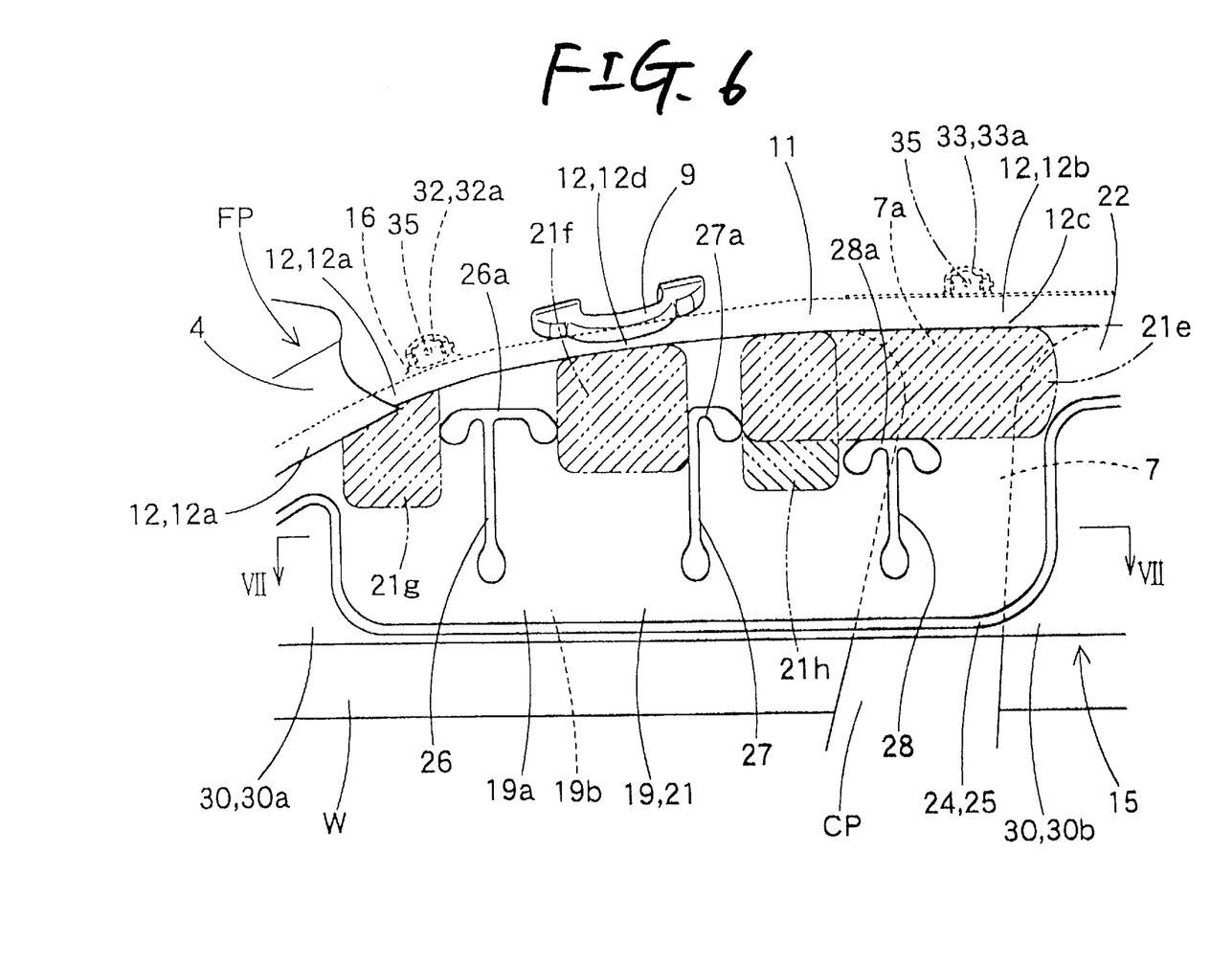
FIG. 6 is a front view showing the front side of the air bag at the time of completing its development, the view being taken from the cabin inside.
Figure 7:
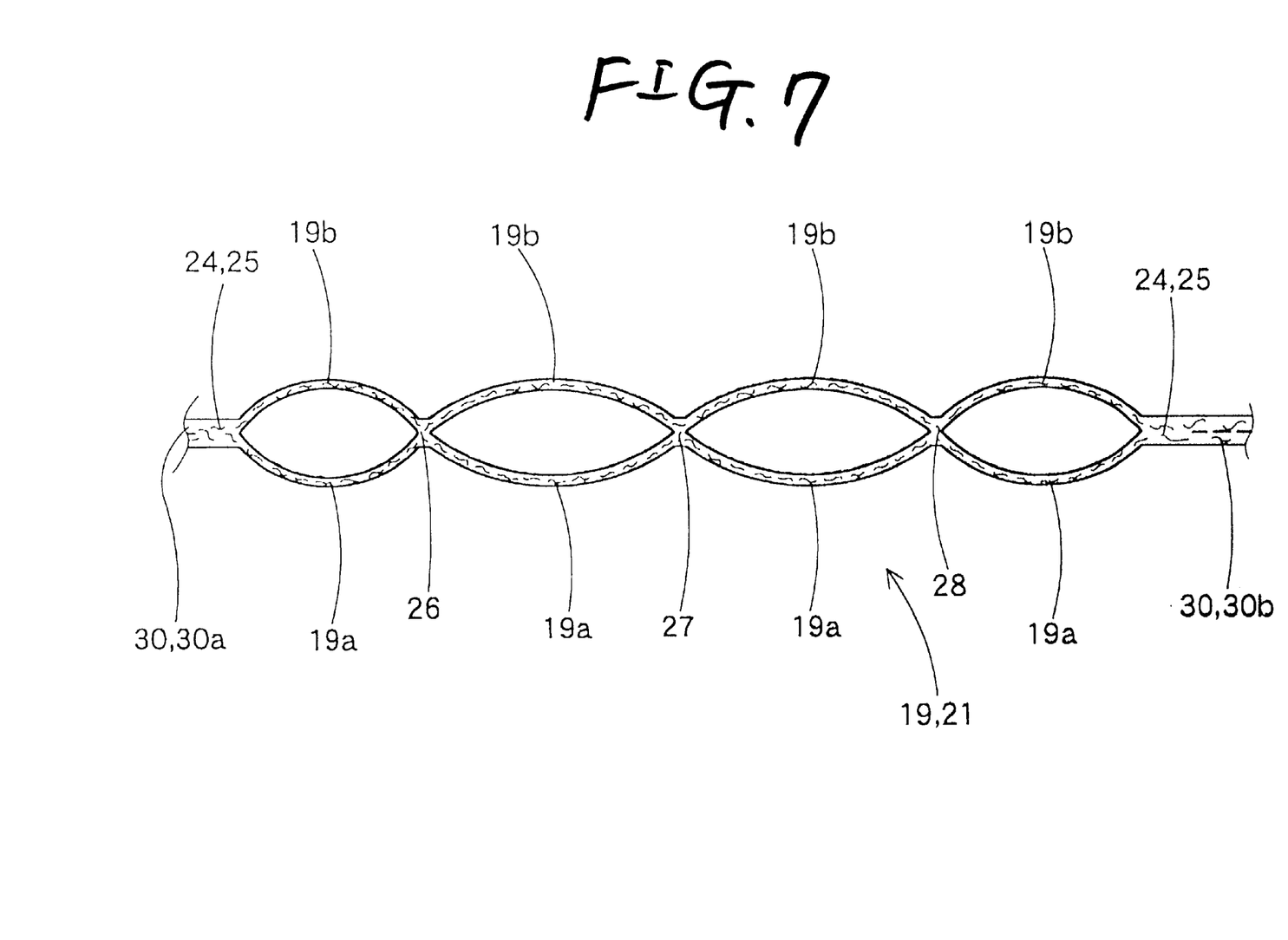
FIG. 7 is a transverse cross sectional view showing the air bag taken on line VII—VII in FIG. 6.

In the air bag 15, the upper end 28a of the thickness defining member, which is located at position lower than the upper end 27a of the remaining thickness defining member 27 by the dimension H, is disposed near of the unsmooth development part 12b (whose development is unsmooth) of the door 12 of the air bag cover 11. With provision of the dimension H, as shown in FIGS. 5 and 6, an inflation part 21e which expands in the front/rear direction in a region above the thickness defining member 28 is also vertically expanded more largely by a volume corresponding to the dimension H of the lowering of the upper end 28a. Accordingly, a large force to forcibly open the unsmooth development part 12b of the door 12 is secured. The inflation part 21e is disposed above the front-seat inflation section 21 which has approached the unsmooth development part 12b. The force to forcibly open the unsmooth development part 12b of the door 12 is further increased. Therefore, even when at the time of opening of the unsmooth development part 12b, its lower end 12c is deformed so as to ride over the upper end 7a of the center pillar garnish 7, it is rapidly and forcibly opened. As a result, the time for the air bag 15 to complete the development and expansion is reduced.

In the air bag 15 of the embodiment, the opening width B2 of the inflow port 21b between the thickness defining members 26 and 27, which is located near the unsmooth development part 12d and provided for flowing downward the inflation gas, is selected to be larger than the opening width B3 of the inflow port 21c between the thickness defining members 27 and 28, and the opening width B1 of the inflow port 21a between the thickness defining member 26 and the peripheral edge part 25. Therefore, as shown in FIGS. 5 and 6, a vertically expanding inflation part 21f of the inflow port 21b, which is located near of the unsmooth development part 12d, expands in the front/rear direction more largely than expansion parts 21h and 21g, which vertically expand in the adjacent inflow ports 21c and 21a, by a distance (about 20 mm in the embodiment) corresponding to the opening width B2 of the inflow port 21b. Accordingly, a large force to forcibly open the unsmooth development part 12d is secured. The inflation part 21f is also disposed above the front-seat inflation section 21 having approached the unsmooth development part 12d. Accordingly, the force to forcibly open the unsmooth development part 12d is more increased, as a matter of course. As a result, even when the unsmooth development part 12d interferes with the assist grip 9 when it opens, its opening angle is increased by a rapid and strong force and it is opened. Accordingly, the time for the air bag 15 to complete the development and expansion is reduced.

In the embodiment, a hollow weave air bag is used for the air bag 15. The air bag may be formed by stitching, adhering using adhesive, welding using high frequency welder or another suitable process. In this case, the invention may be applied to the thickness defining members which couple the cabin-inside and cabin-outside side walls.

Although the invention has been described in its preferred form with a certain degree of particularity, it is understood that the present disclosure of the preferred form can be arrangement of parts without departing from the spirit and the scope of the invention as hereinafter claimed.

What is claimed is:

1. An air bag in use for a head protection air bag device, said air bag being stored along a peripheral edge of an upper fringe of an opening on an indoor side of a vehicle in a state that said air bag is covered with a door of an air bag cover and folded, and when receiving inflation gas, said air bag forcibly opening said door, and developing and inflating downward so as to cover said opening, said air bag comprising:

a cabin-inside side wall;

a cabin-outside side wall;

an inflating section formed between said cabin-inside side wall and said cabin-outside side wall, into which gas for inflation flows; and a plurality of thickness defining members each formed by partially coupling said cabin-inside side wall and said cabin-outside side wall in a region of said inflating section, each of said thickness defining members being arranged side by side in a front and rear direction and extending in the vertical direction;

wherein a first thickness defining member disposed near an unsmooth development part of said door is disposed such that an upper end thereof is located at a position lower than an upper end of a second thickness defining member which is disposed adjacent to said first thickness defining member as well as farther than said first thickness defining member from said unsmooth development part in a state that said air bag is developed flat.

2. An air bag in use for a head protection air bag device according to claim 1, wherein the upper end of said first thickness defining member is located at the position lower than the upper end of said second thickness defining member by about 30 mm to 50 mm.

3. An air bag in use for a head protection air bag device according to claim 1, wherein said first thickness defining member is substantially shaped like a T.

4. An air bag in use for a head protection air bag device, said air bag being stored along a peripheral edge of an upper fringe of an opening on an indoor side of a vehicle in a state that said air bag is covered with a door of an air bag cover and folded, and when receiving inflation gas, said air bag forcibly opening said door, and developing and inflating downward so as to cover said opening, said air bag comprising:

a cabin-inside side wall;

a cabin-outside side wall;

an inflating section formed between said cabin-inside side wall and said cabin-outside side wall, into which gas for inflation flows;

a plurality of thickness defining members each formed by partially coupling said cabin-inside side wail and said cabin-outside side wall in a region of said inflating section, each of said thickness defining members being arranged side by side in a front and rear direction and extending in the vertical direction; and a plurality of inflow ports formed between upper ends of two said thickness defining members or an upper end of one of said thickness defining members and a peripheral edge part of said inflating section;

wherein an opening width of a first inflow port located near an unsmooth development part of said door is larger than an opening width of a second inflow port which is disposed adjacent to said first inflow port as well as farther than said first inflow port from said unsmooth development part in a state that said air bag is developed flat.

5. An air bag in use for a head protection air bag device according to claim 4, wherein the opening width of said first inflow port is larger than the opening width of said second inflow port by about 20 mm.

6. An air bag in use for a head protection air bag device according to claim 4, wherein said first inflow port is formed between two said thickness defining members each being substantially shaped like a T and an inverse J, respectively.

* * * * *